United States Patent [19]

Fioravanti

[11] Patent Number: 4,493,850

[45] Date of Patent: Jan. 15, 1985

[54] METHOD OF TREATING AND CONSERVING FILLED DOUGH FOOD PRODUCTS

[76] Inventor: Mario Fioravanti, Via Zuccoli, 26, Milano, Italy

[21] Appl. No.: 608,935

[22] Filed: May 11, 1984

Related U.S. Application Data

[63] Continuation of Ser. No. 444,435, Nov. 24, 1982, abandoned, which is a continuation-in-part of Ser. No. 202,707, Oct. 31, 1980, abandoned.

[51] Int. Cl.$^3$ .................. A21D 6/00; A21D 15/04; A23L 1/10
[52] U.S. Cl. .................... 426/283; 426/412; 426/458; 426/496; 426/451
[58] Field of Search ............ 426/283, 412, 496, 451, 426/128, 94, 275, 458, 557, 402, 399, 400, 401

[56] References Cited

U.S. PATENT DOCUMENTS 3,193,389 7/1965 Dehne ................... 426/412
3,281,248 10/1966 Fioravanti et al. ........ 426/283

Primary Examiner—George Yeung
Attorney, Agent, or Firm—Auslander & Thomas

[57] ABSTRACT

For treating and conserving filled dough food products, such as "ravioli", "tortellini", "cappelietti" and the like, the products are subjected to a high moisture and temperature environment and then dried until the dough casing thereof reaches a predetermined moisture content. Then the dried products are packaged under vacuum and subjected again to a high temperature environment, thereby obtaining filled dough packaged products which can be perfectly conserved for long periods without developing any signs of deterioration, mold, etc.

3 Claims, No Drawings

METHOD OF TREATING AND CONSERVING FILLED DOUGH FOOD PRODUCTS

This application is a continuation of application Ser. No. 444,435 filed 11/24/82, now abandoned, which is a continuation-in-part application of Ser. No. 202,707, filed 10/31/80, now abandoned.

BACKGROUND OF THE INVENTION

This invention relates to a method of treating and conserving filled dough food products.

Filled or stuffed dough food products refer herein to those food products which comprise relatively small casings of dough, of any geometrical or fancy shapes, filled with a mixture or "emulsion" of chopped meat, vegetables, cheese, spices, etc., and the best known by their traditional names of "ravioli", "tortellini", "cappelletti", "canelloni", etc.

The filler or filling of the above filled dough food products may be broadly related to the sausage class of food products in that it comprises a lump of meat, or other mixture, wrapped in a sheet of new-made dough. Similarly to sausages, the flavor of the filler of filled dough food products improves with an adequate seasoning treatment. However, a special problem is encountered in the instance of filled dough products: in fact the seasoning process, while improving the taste quality of the filler by enhancing its flavor, brings about a deterioration of the appearance and properties of the casing formed from dough.

Known are treatments for preserving, over a short or long period of time, such filled dough food products which provided for the drying thereof (which drying process would generally continue spontaneously even after the drying treatment proper has been completed), but it is also known that this resulted in the dough casings becoming brittle, developing cracks, and finally turning to crumbles, thereby their appearance made them totally unsuitable for sale.

Moreover, a deep drying treatment could damage the filler as well as the dough casing, because, as is well known in the art, dehydrated meat does not "recover" with the simple addition of water, not even boiling water. Lastly, the deep drying effect brought about by conventional preservation methods also resulted in an undue loss of weight, and consequently in an increased cost of the product.

Known are also various methods intended for providing a similar treatment to seasoning, or partly overlapping it, that is methods of preserving such filled dough food products over more or less prolonged time periods.

Such known methods ranged from the canning of the product in savory sauces, to deep freezing or drying. None of those methods has been successful in practice from the standpoint of mass production requirements owing to various disadvantages.

Thus, canned products, in addition to forcing upon the consumer the savor (not always preferred) of ready-made sauces, tend to develop a soaked and softened condition of the dough, which can no longer have its generally preferred tough consistency.

On the other hand, deep freezing encourages cracking and disgregation of dough owing to the surface dehydration caused by the application of cold. Moreover, deep freezing involves high refrigeration costs for production, distribution, and conservation.

Finally, dehydration is likely to result in the dough developing surface cracks, in the deterioration of the filler owing to the high temperatures involved, in a degradation of the flavor due to partial evaporation of spices, in an increased cost of the product due to the loss of weight brought about by the drying process, and so forth.

Therefore, the methods proposed heretofore for preserving or conserving filled dough food products have failed to enhance the product flavor as provided by proper seasoning.

In addition thereto, such conventional conservation methods resulted in final products which were not entirely satisfactory even from other points of view. Thus, for example, the method disclosed in U.S. Pat. No. 3,281,248 which provided a wet type of high temperature treatment for filled dough food products, resulted in final products the dough casing whereof had a hard, marble-like consistency, such that the product would rebounce off a hard surface, such as a table top.

SUMMARY OF THE INVENTION

This invention is mainly directed to obviating the drawbacks of known methods of preserving or conserving filled dough food products or articles, by providing a treatment for the filler of filled dough products which affords a proper seasoning thereof, while ensuring a desired quality and appearance of the related dough casing over prolonged periods of time.

A further object of this invention is to provide a method of seasoning the filler of filled dough food products or articles, which is highly reliable not only on account of the prolonged conservation of the product made possible thereby, but also because of the visual check of the state of conservation of the product afforded thereby.

These and other objects, such as will be apparent hereinafter, are achieved by a method of treating and conserving filled dough food products, which comprises the steps of subjecting said filled dough food products to a high moisture environment at a high temperature, ranging from 70° C. to 100° C., subsequently drying the product until the dough portion thereof reaches an average moisture content level of 23 to 28%, packaging said filled dough food product under vacuum, and subjecting said packaged filled dough food product to a high temperature in the 70° C. to 100° C. range.

DESCRIPTION OF THE PREFERRED EMBODIMENTS

The method according to this invention comprises a first step, wherein the filled dough food product, such as "ravioli", "tortellini", etc., being delivered by a conventional forming machine in the form of small filled casings or shells of dough having an average wall thickness of about 0.6 mm., is passed through a moist and hot environment, e.g. a saturated humidity environment at approximately 70°-100° C., or through a hot or boiling alimentary liquid, such as water, broth, and the like. This step may last from 3 to 5 minutes where the product is passed through a vapor environment, e.g. over a boiling water tank in an enclosed environment, or from a few seconds to 2-3 minutes, preferably 40 seconds, where it is dipped in a boiling liquid.

Then the product is dried in a hot ventilated environment, until the outside surface layer of the dough of a thickness of about 0.1 to 0.2 mm reaches a residual humidity of 16 to 19 percent. If the humidity measurements are made on the entire dough portion the average humidity of the entire dough portion range from 23 to 28 percent. These values have proved to be critical ones, because when the humidity is lower, crumbling is likely to occur, when it is higher, the dough is sticky and unsuitable for further processing, since a sticky mass-like agglomerate is formed. Preferably, the drying process involves initial radiation of the product for 3 to 5 minutes with glowing lamps or electric resistors swept by an air flow, e.g. as generated by a blower fan placed behind them. Successively, the product is allowed to reach the desired final moisture content in a common drier for alimentary dough-based products.

The hot-wet-hot action of the cited treatment steps produces a surface gelling of the dough portion which, when dried to the required final moisture content, remains in a "soft" non-sticking condition which is retained throughout the subsequent treatments.

The product is then transferred to a vacuum packaging step, e.g. as carried out on a vacuum packaging machine for sausages. This step may be carried out under high vacuum conditions, or a given amount of an inert gas, such as nitrogen, may be introduced into the package. Preferably, the packaging material will be a flexible plastic film, suitable for food article use, such as polypropylene, PVC, various plastic laminates, etc.

The packaged product is then subjected to an after-packaging treatment, wherein it is passed through an overheated environment, at approximately 70° to 100° C.

For this purpose, cabinets or rooms may be used whereinto the packages to be treated are introduced after the temperature in such cabinets or rooms has reached about 35° C. to 40° C. These enclosures (cabinets or rooms) are then closed tight and heat is added during about 60 minutes in the average until the desired treatment temperature is reached. The duration of the heating depends on the structural features of the heating cabinets and the heat intensity. Once the desired temperature having been reached the product is maintained at said temperature during about 30 minutes. As an example, a commercially suitable conservation of the product would require heating at about 90° C. for approximately thirty minutes.

It should be noted that the above-described thermal after-treatment under vacuum develops an adequate bactericide action without resulting in permanent dehydration.

In fact, following that treatment, the packages present themselves in a blown or swelled condition, with several condensation droplets adhering to the package inside. However, it has been found that such droplets are then re-absorbed by the product within 45-90 minutes, and the wrapping package loses its swelled condition to re-acquire the peculiar contracted condition of vacuum packages.

According to the invention, the dough portion should not have a thickness dimension below 0.7 mm (0.0275 inches), because the heat applied to the product would otherwise melt the fat contained in its filler, which produces an undesired marble-like discoloration of the dough forming the filler casing.

It has also been found that suitable dimensions for "ravioli" are 27×23×9 mm (1.063×0.905×0.354 inches) with a unit weight of 2.5 grams (0.088 ozs.); for "tortellini", the dimensions should be 28×26×14 mm (1.102×1.024×0.551 inches) with a unit weight of 4 grams (0.141 ozs.). It is anyhow advantageous that the "ravioli" comprise 60 to 70 percent dough and 40 to 30 percent filler.

After that heat treatment, the packages are cooled by simply leaving them exposed to room temperature.

EXAMPLES

In the following Examples the percentage are by weight.

Filled casings of dough of the "tortellini" type were formed and filled in conventional manner in a conventional "tortellini" forming machine.

The dough composition of the so formed "tortellini" dough casings was in average as follows:
flour of 70% common or bread wheat, 30% of Emmer wheat (durum), six eggs per 1 Kg. of flour.

The filling was made of about 70% of chopped beef meat in which chopped Bologna sausage, ham, salame, grated Parmesan cheese were admixed and 30% of grated bread. The size of the average "tortellini" casing was 28×26×14 mm with an average thickness of the dough casing wall of about 0.6 mm. A batch of filled "tortellini" casing so obtained was immersed in boiling water and maintained in boiling water during 40 seconds. The filled "tortellini" casings were then brought into an infrared radiation drier and subjected there to infrared radiation during 4 minutes with simultaneous air current flow sweeping past the "tortellini" casings. The "tortellini" casings were then brought into a common drier for alimentary dough based products and subjected to drying until the moisture content of the entire dough portion from which the filling was removed was in average between 23 and 28 percents. In order to establish rapidly the degree of drying attained by the "tortellini" casings during the drying process, periodically samples of "tortellini" casings were taken, from which a thin superficial layer of about 0.1 to 0.2 mm thickness was scraped away and crushed in a mixer. The weight of the powder so obtained was repeatedly measured in a Mittler L P 12 scale before and after total infrared drying and the moisture content recorded. An indication of the degree of drying was thus rapidly obtained, which made it possible rapidly to adjust the operation of the common drier. Upon termination of the drying process the average humidity of the entire dough casing of some samples of "tortellini" was measured in the manner above described for the scraped dough layer of the casings.

It has been found that in average a moisture content level of 16% for the scraped away superficial layer of the dough casing corresponds in average to a moisture content level of 23% for the entire dough portion of the "tortellini" casings and a moisture content level of 19% for the superficial layer corresponds to a moisture content level of 28% for the entire dough casing from which the filling was removed. In fact, it has been found that upon drying the distribution of moisture along the thickness of the casing wall is increasing from the external surface towards the interior.

Subsequently the so dried "tortellini" casings were packaged under vacuum in plastics bags each filled with a quantity of 0.250 Kg of "tortellini" casings. The process was carried out in a conventional vacuum packaging machine. The sealed bags containing the "tortellini" casings under vacuum were then brought into heating cabinets preheated at a temperature of about 40° C. which were closed tightly after introduction of the "tortellini" casings and heated up to 90° C. at which temperature the "tortellini" packages were maintained for the duration of about 30 minutes. The "tortellini" bags were then stored at room temperature.

For the purpose of quality tests in a first operative cycle three batches $A_1$, $A_2$, and $A_3$ each of 56 vacuum sealed "tortellini" containing bags were produced in the above described manner except for the drying stage, which for the batch $A_1$ was regulated so that the moisture content of the "tortellini" casing dough was in the normal range between 23 and 26%. For the batch $A_2$ the drying stage was regulated so that the moisture content of the dough casings was higher than the above normal range, as will appear from the following tables, whereas for the batch $A_3$ the drying stage was regulated so that the moisture content of the "tortellini" dough casings was lower than the above described normal range, as will appear from the following tables. In order to obtain reliable average data batches $B_1$, $B_2$, $B_3$ and batches $C_1$, $C_2$ and $C_3$ each of 56 vacuum sealed "tortellini" bags were produced in a second and third operative cycle respectively in the manner as above described in which the batches $B_1$ and $C_1$ had the dough casings moisture content in the above indicated normal range, whereas such moisture content was higher in the batches $B_2$, $C_2$ and lower in the batches $B_3$, $C_3$, as it appears from the following tables.

The comparative quality tests were carried out as follows.

Beginning with the first day after the completion of the production cycles, the stored "tortellini" casings were subjected to the hereinafter described quality tests at 15 days intervals, by taking them from the stored "tortellini" bags after 15 days and after 30 days storage period at an average room temperature of about 27° C. The "tortellini" to be tested were always taken at 15 days intervals from sealed bags, which were opened at the moment in which the tests began.

The following tests were carried out:

| | |
|---|---|
| moisture content of the dough | (abbreviation used in the tables: MST) |
| stickiness | (abbreviation used in the tables: ST) |
| crumbling | (abbreviation used in the tables: CR) |
| water activity tests | (abbreviation used in the tables: WA) |
| organoleptic properties | (abbreviation used in the tables: OP) |
| microbiological examinations, comprising the quantitative search for | |
| the total bacterial load | (abbreviation used in the tables: BL) |
| the sulphyte reducing clostridia | (abbreviation used in the tables: CLD) |
| the coliforms | (abbreviation used in the tables: CLF) |
| *Staphylococcus aureus* | (abbreviation used in the tables: STA) |
| molds | (abbreviation used in the tables: MLD) |

The tests were carried out by the Italian alimentary research institute ABE Ricerche S.a.s. of Florence, Italy under the Applicant's instructions.

The materials and methods used in the tests are described as follows:

Moisture content: the dough casing alone i.e. without stuffing, is crushed accurately in a mixer and the weight measured twice in a Mettler L P 12 scale before and after drying by means of infrared rays.

Stickiness: is determined by manual and visual stickiness sensation based on the external aspect of the casing and its softness and the degree of difficulty of separating by hand the single casings from one another.

Crumbling: is determined on the basis of the external aspect, the hardness of single casings, the fragmentation thereof and also on the basis of the vacuum losses of the plastics bag, owing to perforations thereof by hardened fragments of "tortellini" casings.

Water activity: defined by Scott (1953) as the ratio between vapor pressure of water contained in the alimentary product tested and the vapor pressure of pure water at the same temperature of measurement, was measured in a water activity analyzer F 25 manufactured by the Italian Limited Liability Company Pool Bioanalysis Italiana of Milan, Italy. Low values of Water Activity are known to reduce the growth of microorganisms present in the tested alimentary product.

Organoleptic properties: are determined on the basis of the color, smell and taste.

Microbiological examination: is carried out quantitatively and for each parameter it is referred to one of the whole product, i.e. dough and stuffing; the examination comprises total microbiological load (Plate count agar), sulphyte reducing clostridia (SPS agar), coliforms (brilliant green bile broth with M.P.N. method), molds (Potato Dextrose Agar, acidified at pH 3,5), the culture medium has been supplied by DIFCO, Detroit, U.S.A.

From the 56 vacuum sealed "tortellini" containing bags of each of the above listed batches $A_1$, $A_2$, $A_3$, $B_1$, $B_2$, $B_3$, $C_1$, $C_2$, $C_3$ 8 bags were selected, the "tortellini" casings of which were tested and a mean value of the results obtained was calculated.

The following table 1 indicates the mean values of the test results obtained for each of the above indicated batches at the day of production of the batches.

The following tables 2 and 3 indicate the mean values of the test results obtained for the batches $A_1$,$B_1$,$C_1$ at 15 days and 30 days intervals beginning from the day of production of the batches, taking into account that the vacuum sealed bags were stored at an average room temperature of about 27° C.

Since from the tests carried out on the day of production of batches it appeared that the batches $A_2$,$A_3$,$B_2$, $B_3$ and $C_2$,$C_3$ are commercially useless owing to their stickiness and crumbling properties, no tests were carried out for these batches after the indicated storage periods and therefore these batches do not appear in the tables 2 and 3.

TABLE 1

| | Tests carried out on the day of production | | | | | | | | | |
|---|---|---|---|---|---|---|---|---|---|---|
| Batch | MST | ST | CR | WA % | OP | BL | CLD | CLF | STA | MLD |
| $A_1$ | 25 | absent | absent | 0.936 | normal | 213 | 0 | 0 | 0 | 0 |
| $B_1$ | 26.2 | absent | absent | 0.96 | normal | 257 | 0 | 0 | 0 | 0 |
| $C_1$ | 26 | absent | absent | 0.935 | normal | 2,825 | 0 | 0 | 0 | 0 |
| $A_2$ | 30.8 | remarkable | — | — | — | — | — | — | — | — |
| $B_2$ | 29.8 | " | — | — | — | — | — | — | — | — |
| $C_2$ | 29 | " | — | — | — | — | — | — | — | — |
| $A_3$ | 16.7 | — | remarkable | — | — | — | — | — | — | — |

TABLE 1-continued

| | | | Tests carried out on the day of production | | | | | | | |
|---|---|---|---|---|---|---|---|---|---|---|
| Batch | MST | ST | CR | WA % | OP | BL | CLD | CLF | STA | MLD |
| $B_3$ | 16.5 | — | remarkable | — | — | — | — | — | — | — |
| $C_3$ | 17.5 | — | remarkable | — | — | — | — | — | — | — |

Since tortellini of batches $A_2$, $B_2$, $C_2$ and $A_3$, $B_3$ and $C_3$ were not usable owing to their remarkable stickiness and crumbling, further tests for these batches have been omitted.

TABLE 2

| | Tests carried out 15 days after production with storage at 22° C. | | | | | | | | | |
|---|---|---|---|---|---|---|---|---|---|---|
| Batch | MST | ST | CR | WA % | OP | BL | CLD | CLF | STA | MLD |
| $A_1$ | 27.1 | absent | absent | 0.940 | normal | 1,290,000 | 0 | 0 | 0 | 0 |
| $B_1$ | 28.1 | " | " | 0.950 | " | 376,000 | 0 | 0 | 0 | 0 |
| $C_1$ | 28.0 | " | " | 0.951 | " | 816,625 | 0 | 0 | 0 | 0 |

TABLE 3

| | Tests carried out after 30 days from the production with storage at 22° C. | | | | | | | | | |
|---|---|---|---|---|---|---|---|---|---|---|
| Batch | MST | ST | CR | WA % | OP | BL | CLD | CLF | STA | MLD |
| $A_1$ | 28.2 | absent | absent | 0.962 | normal | 5,042,000 | 0 | 0 | 0 | 2.5 |
| $B_1$ | 27.8 | " | " | 0.935 | " | 608,750 | 0 | 0 | 0 | 0 |
| $C_1$ | 27.4 | " | " | 0.945 | " | 2,006,250 | 0 | 0 | 0 | 62.5 |

As it appears from the test results indicated in Tables 1, 2 and 3, the "tortellini" of batches $A_1$, $B_1$ and $C_1$ showed no stickiness nor crumbling properties. The organoleptic properties were maintained unchanged after storages up to the 30 days period. No solphyte reducing clostridia, no coliforms and no Staphylococcus aureus were found after the storage periods of 30 days. Among the 8 "tortellini" samples of batches $A_1$ and $C_1$ molds were found only in two "tortellini" samples after the 30 days storage period in the amount of 20 and 500 per gram rispectively. These occasional molds are probably due to a defective closure of the bag containing them, so that the average value has been affected by them. However, taking into account that among 60 samples tested, only two were defective, the statistical probability that bags with defective closure are produced, is rather low.

As to the bacterial load, note should be taken that the same calculated per gram attained, after 30 days storage period at an average temperature of 27° C., the values ranging from a minimum of 180,000 to a maximum of 1,140,000. For a non sterilized but only pasteurized food product these values may be considered as satisfactory, taking into account that the bacterial flora was of a common saprophytic type represented by bacillaceae and coccaceae, such as those which are commonly found in the type of stuffing used for the tested "tortellini".

Even though the water activity WA of the product was rather high the heat treatment combined with the vacuum sealing packaging made a conservation possible, which maintained the "tortellini" fresh despite the relatively high storage temperature.

The treatments provided by the method according to this invention result in filled dough packaged products which can be conserved in perfect conditions over a period of over four months without developing any signs of deterioration, mold, etc. Thanks to the long conservation time afforded, the filler develops excellent taste qualities due to seasoning. The dough portion, as a result of the treatment undergone, is markedly non-sticking both relatively to adjacent "ravioli", "tortellini", etc. which it contacts during the aforementioned processing steps, and relatively to the film wherein it is packaged, thus greatly facilitating its handling during the treatment. It has also been found that the cited "softness" is neither lost during the application of high vacuum, nor during the heat after-treatment.

Furthermore, the product, when packaged as described hereinabove, advantageously allows visual inspection of any inceptive deterioration thereof. In effect, the product deterioration is associated with the formation of fermentation gases which will inflate the package causing the same to become loose. This same loosening effect may also be an indication of defective sealing of the package, of package puncturing, of faulty packaging, etc., and allows in any case such loosened packaged to be rejected upon a simple visual check.

It will be appreciated from the foregoing that the method according to this invention fully achieves its objects. It should be understood, however, that the description provided hereinabove, as referred to a preferred embodiment of the inventive method, is merely illustrative, and that the scope of the present invention encompasses all those modifications and variations which can present themselves as evident for the art.

I claim:

1. A method of treating and preserving filled dough products in the form of filled dough shells selected from the group of ravioli, tortellini, cappelletti and canelloni, which comprises the steps of subjecting filled dough shells to a high moisture environment at a high temperature, ranging from 70° C. to 100° C. range to provide surface gelling, subsequently drying the shells until the dough thereof reaches a moisture content level of 23 to 28 percent to prevent crumbling of the dough shells, packaging said dried dough shells under vacuum, and subjecting said packaged filled dough shells to a high temperature in the 70° C. to 100° C. range for a predetermined period of time sufficient to preserve the filled dough shells.

2. A method of treating and preserving filled dough food products, according to claim 1, wherein said high moisture environment comprises steam, or water, or broth.

3. A method of treating and preserving filled dough food products, according to claim 1, wherein the product is subjected, following the packaging thereof, to a temperature of 90° C. for approximately 30 minutes.

* * * * *